US012370427B2

(12) United States Patent
Fitzpatrick et al.

(10) Patent No.: US 12,370,427 B2
(45) Date of Patent: Jul. 29, 2025

(54) PUTTING BIOFEEDBACK SYSTEM THAT ANALYZES MOTION DATA

(71) Applicant: Blast Motion Inc., San Marcos, CA (US)

(72) Inventors: Michael Fitzpatrick, San Marcos, CA (US); Bhaskar Bose, San Marcos, CA (US)

(73) Assignee: Blast Motion Inc., San Marcos, CA (US)

( * ) Notice: Subject to any disclaimer, the term of this patent is extended or adjusted under 35 U.S.C. 154(b) by 337 days.

(21) Appl. No.: 17/894,099

(22) Filed: Aug. 23, 2022

(65) Prior Publication Data

US 2024/0066376 A1 Feb. 29, 2024

(51) Int. Cl.
*A63B 69/36* (2006.01)
*A63B 24/00* (2006.01)
*A63B 71/06* (2006.01)

(52) U.S. Cl.
CPC ...... *A63B 69/3685* (2013.01); *A63B 24/0003* (2013.01); *A63B 71/0622* (2013.01); *A63B 2071/0625* (2013.01); *A63B 2220/44* (2013.01); *A63B 2220/62* (2013.01); *A63B 2220/833* (2013.01); *A63B 2225/50* (2013.01)

(58) Field of Classification Search
CPC ............ A63B 69/3685; A63B 24/0003; A63B 71/0622; A63B 2071/0625; A63B 2220/44; A63B 2220/62; A63B 2220/833; A63B 2225/50
See application file for complete search history.

(56) References Cited

U.S. PATENT DOCUMENTS

| 3,992,013 A | * | 11/1976 | Golden | A63B 69/3632 |
| | | | | 473/409 |
| 4,251,077 A | * | 2/1981 | Pelz | A63B 69/3614 |
| | | | | 473/222 |
| 4,615,526 A | * | 10/1986 | Yasuda | A63B 69/36 |
| | | | | 273/456 |
| 5,269,519 A | * | 12/1993 | Malone | A63F 13/245 |
| | | | | 473/154 |

(Continued)

OTHER PUBLICATIONS

International Search Report issued in PCT/US23/72682 on Jan. 3, 2024.

*Primary Examiner* — Dmitry Suhol
*Assistant Examiner* — Jason Pinheiro
(74) *Attorney, Agent, or Firm* — ARC IP Law, PC; Joseph J. Mayo (57) ABSTRACT

A system that analyzes motion of a putter and provides feedback to the golfer as a training aid to guide the golfer towards making better putting strokes. The putter may be equipped with an inertial motion sensor that captures data throughout a stroke; data may be transmitted to a processor, such as a mobile device or a server, for analysis, and feedback signals may be sent to the golfer throughout the stroke based on this analysis. For example, audio tones (generated for example by a mobile phone) may change depending on whether the putting stroke has the desired characteristics. The system may support different operating modes that provide feedback on different putting features. Illustrative modes may for example provide feedback on the putter orientation at address, on the timing of the backstroke, and on the changes in putter face orientation through the stroke.

12 Claims, 8 Drawing Sheets

(56) References Cited

U.S. PATENT DOCUMENTS

| | | | | |
|---|---|---|---|---|
| 5,342,054 | A * | 8/1994 | Chang | A63B 24/0021 434/252 |
| 5,401,026 | A * | 3/1995 | Eccher | A63B 24/0021 473/199 |
| 5,441,256 | A * | 8/1995 | Hackman | A63B 60/42 473/409 |
| 5,591,088 | A * | 1/1997 | Bianco | A63B 69/36 706/45 |
| 5,643,098 | A * | 7/1997 | Monahan | A63B 69/3685 473/230 |
| 5,685,782 | A * | 11/1997 | Lipps | A63B 69/3608 473/220 |
| 5,718,639 | A * | 2/1998 | Bouton | A63B 69/3614 473/151 |
| 5,833,549 | A * | 11/1998 | Zur | A63B 69/0002 463/36 |
| 5,976,022 | A * | 11/1999 | Williams | A63B 69/3614 473/409 |
| 6,095,928 | A * | 8/2000 | Goszyk | A63B 69/3614 345/158 |
| 8,579,720 | B2 * | 11/2013 | Bittner | G09B 19/0038 473/226 |
| 8,616,993 | B2 * | 12/2013 | Bittner | A63B 71/0686 473/226 |
| 8,926,445 | B2 * | 1/2015 | Davenport | A63B 24/0006 473/409 |
| 11,285,368 | B2 * | 3/2022 | Kim | G01S 19/19 |
| 2002/0069133 | A1 * | 6/2002 | Currie | A63B 53/007 473/282 |
| 2002/0103035 | A1 * | 8/2002 | Lindsay | A63B 24/0021 473/151 |
| 2002/0115046 | A1 * | 8/2002 | McNitt | A63B 69/36 434/252 |
| 2006/0166738 | A1 | 7/2006 | Eyestone et al. | |
| 2007/0238538 | A1 | 10/2007 | Priester | |
| 2007/0265105 | A1 | 11/2007 | Barton et al. | |
| 2007/0298895 | A1 * | 12/2007 | Nusbaum | A63B 69/3614 473/131 |
| 2007/0298896 | A1 * | 12/2007 | Nusbaum | A63B 69/3661 473/131 |
| 2008/0153613 | A1 * | 6/2008 | Choi | A63B 69/3658 473/156 |
| 2008/0200278 | A1 * | 8/2008 | Oyer | A63B 53/0487 473/409 |
| 2010/0255922 | A1 * | 10/2010 | Lueders | A63B 53/02 473/223 |
| 2012/0277016 | A1 | 11/2012 | Boyd et al. | |
| 2013/0085008 | A1 | 4/2013 | Hall | |
| 2013/0137528 | A1 * | 5/2013 | Ishii | A63B 37/0003 473/409 |
| 2013/0267335 | A1 * | 10/2013 | Boyd | A63B 53/047 473/222 |
| 2014/0297217 | A1 | 10/2014 | Yuen | |
| 2017/0061817 | A1 * | 3/2017 | Mettler May | A61B 5/1124 |
| 2017/0252607 | A1 * | 9/2017 | Haas | A61B 5/11 |
| 2017/0274256 | A1 * | 9/2017 | Brekke | A63B 60/42 |
| 2019/0262690 | A1 * | 8/2019 | Kim | A63B 69/3685 |
| 2020/0276488 | A1 * | 9/2020 | Cottam | G16H 40/63 |
| 2021/0228963 | A1 * | 7/2021 | Thornbrue | A63B 69/3635 |

* cited by examiner

PUTTING BIOFEEDBACK SYSTEM THAT ANALYZES MOTION DATA

BACKGROUND OF THE INVENTION

Field of the Invention

One or more embodiments setting forth the ideas described throughout this disclosure pertain to the field of motion capture sensors and analysis of motion capture data. More particularly, but not by way of limitation, one or more aspects of the invention enable a putting biofeedback system that analyzes motion data.

Description of the Related Art

Effective putting requires precise, repeatable movement of the putter so that the putter face contacts the golf ball in exactly the right orientation and with the desired velocity. Manual training aids are available to assist a golfer in learning a correct putt stroke. For example, golfers can print or purchase a matt with a slightly curved track that the putter head should follow for an ideal stroke, and they can practice following this track. A drawback of these manual aids is that the golfer must transport them to any location where he or she wants to practice putting. In addition, the golfer is responsible for watching the putt stroke relative to the putting aid; feedback on the quality of the stroke is not automatic.

Current sensor technologies enable a potential alternative to these manual putting aids which has not yet been incorporated into the prior art. A system that senses the precise motion of a putter may be used for putt stroke training by comparing the actual motion to the desired motion and generating "biofeedback" signals to the golfer to indicate whether the putting stroke has the desired characteristics. There are no known systems that provide putting biofeedback based on motion sensor data.

For at least the limitations described above there is a need for a putting biofeedback system that analyzes motion data.

BRIEF SUMMARY OF THE INVENTION

Embodiments of the invention enable a putting biofeedback system that analyzes motion data. A golfer may use the system for putt training and practice. The system may track the position and orientation of the putter, calculate metrics for putts, and generate feedback signals that help the golfer improve the putt strokes.

One or more embodiments of the invention may include an inertial sensor coupled to a putter, a feedback signal generator configured to transmit a feedback signal to the user, and a processor coupled to the inertial sensor via a network and coupled to the feedback signal generator. The sensor may have an accelerometer, a gyroscope, and a network interface. The network interface may be wireless in one or more embodiments. The accelerometer may be a three-axis accelerometer and the gyroscope may be a three-axis gyroscope in one or more embodiments. The inertial sensor may be configured to capture inertial sensor data during a putting session wherein a user performs one or more putt strokes with the putter, and to stream this data over the network interface as the data is captured. The processor may be configured to receive the inertial sensor data, determine a starting time of a putt stroke and calculate one or more putt stroke metrics from the data, calculate a feedback signal value from the putt stroke metrics, and transmit the feedback signal value to the feedback signal generator.

In one or more embodiments the processor may calculate the feedback signal value and transmit this value to the feedback signal generator at multiple times during the putt stroke prior to the ending time of the putt stroke.

In one or more embodiments the processor and the feedback signal generator may be integrated into a mobile device used by the user.

In one or more embodiments the feedback signal generator may include a speaker and the feedback signal may be an audio output from the speaker. The feedback signal value may include one or more of pitch and volume of the audio output.

In one or more embodiments, feedback may be based on backstroke timing. The stroke metrics may include the duration of a backstroke, which is the elapsed time between the starting time of the putt stroke and the current time. When the duration of the backstroke equals or exceed a target backstroke duration, the feedback signal value may be set to a stop backstroke value.

In one or more embodiments, feedback may be based on the putter orientation at address. The stroke metrics may include the actual orientation of the putter at address, and the feedback signal value may be set based on the difference between this orientation at address and an ideal putter orientation at address.

In one or more embodiments, feedback may be based on the putter trajectory. The stroke metrics may include the distance travelled by the putter face since the starting time of the putt stroke, and a change in orientation of the putter face since this starting time. When the change in orientation is within a target face orientation range that is a function of the distance travelled, the feedback signal may be set to an on track value; otherwise the feedback signal may be set to an off track value that differs from the on track value.

In one or more embodiments, the processor may be configured to be in a feedback mode selected from multiple feedback modes, and the calculation of the feedback signal value may be a function of the feedback mode. In one or more embodiments the multiple feedback modes may include a backstroke timing feedback mode (with the feedback signal based on backstroke timing as described above), an orientation at address feedback mode (with the feedback signal based on putter orientation at address as described above), and a putter trajectory feedback mode (with the feedback signal based on the putter trajectory as described above).

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIGS. 1A and 1B show elements of an illustrative putting biofeedback system that changes audio tones emitted by a mobile phone based on whether a putter is following the desired trajectory. FIG. 1A shows feedback for a correct putter trajectory, and FIG. 1B shows feedback for a trajectory that deviates from the desired path.

DETAILED DESCRIPTION OF THE INVENTION

A putting biofeedback system that analyzes motion data will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

In one or more embodiments of the invention, the motion of a putter may be measured with one or more sensors, and sensor data may be analyzed to generate feedback signals that are transmitted to the golfer. This process may occur in almost real-time, so that as soon as the golfer makes an error or as soon as a correction is needed, a feedback signal may be sent. This rapid feedback loop may substantially enhance the learning cycle for putting.

Figure 1A:
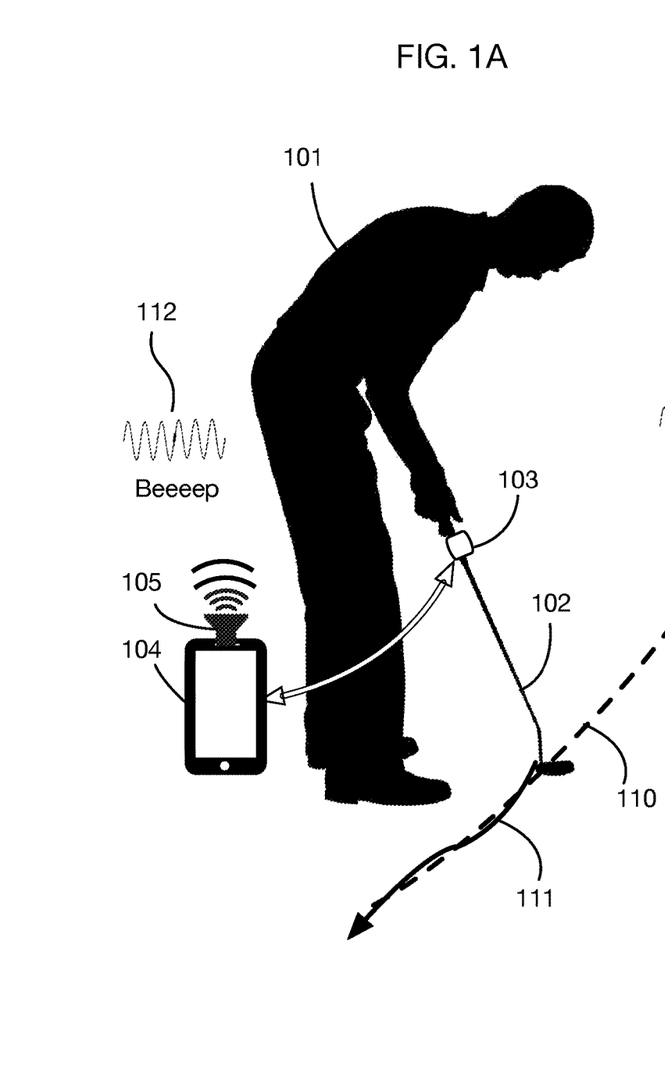
Figure 1B:
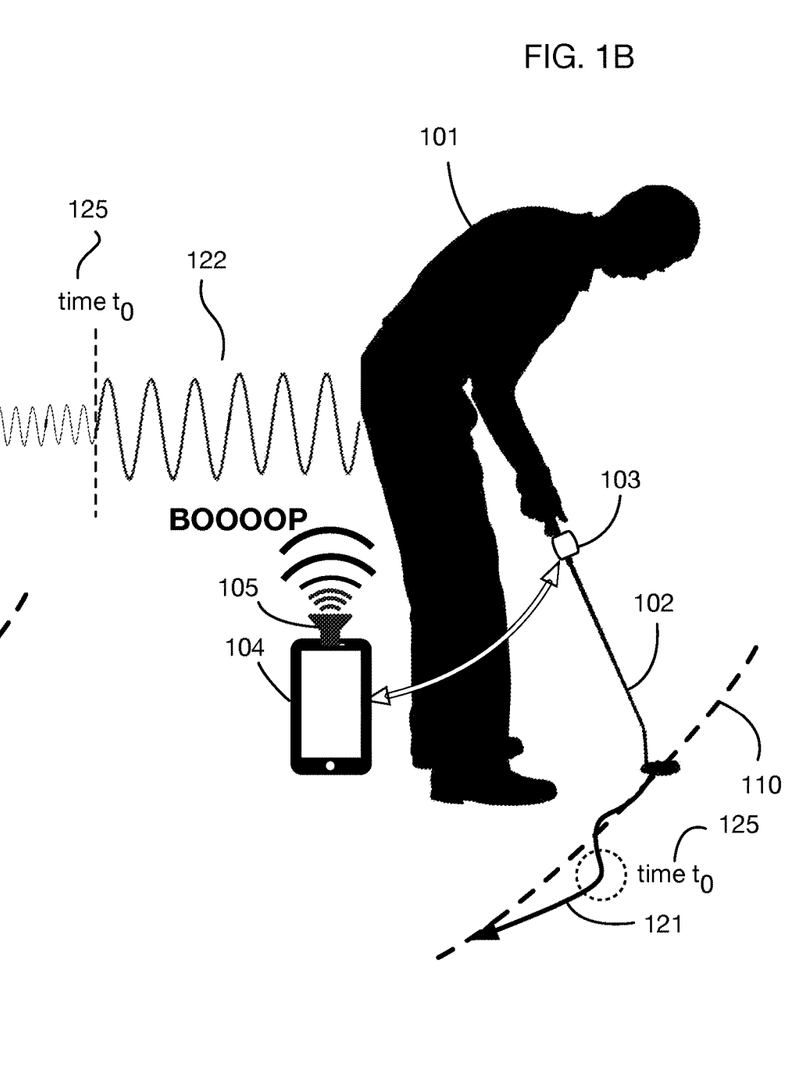

Sensors that measure the motion of the putter may for example be integrated into or attached to the putter. (In one or more embodiments, alternative or additional sensors may be used that are not fixed to the putter, such as video cameras that observe the putting stroke for example.) FIGS. 1A and 1B show an illustrative embodiment with putter 102 that has an inertial motion sensor package 103 integrated into or coupled to the putter. For example, the inertial sensor may be placed into the grip of the putter. Sensor 103 may capture data during movements of putter 102 by user 101. Data may be captured many times per second; for example, an illustrative embodiment may capture data 500 or more times per second. The sensor 103 may include or be coupled to a network interface, such as a wireless interface, so that sensor data can be streamed from the sensor immediately after it is captured. The wireless interface may be for example, without limitation, Bluetooth, Bluetooth Low-Energy, or Wi-Fi. Streamed sensor data may be received by one or more processors and may be analyzed to generate feedback signals on the characteristics of the user's putting strokes or other movements with the putter. In the embodiment show in FIGS. 1A and 1B, streamed sensor data is received by a mobile device 104, such as the user's mobile phone. Data may be received by or transmitted to any processor or processors for analysis. For example, in lieu of a mobile device, the sensor 103 may transmit data to a local gateway that forwards the data to a web-based server for analysis. Mobile device 104 may also communicate with other servers or devices, and data analysis may be performed by any combination of processors that are network connected. Mobile device 104 may be for example, without limitation, any type of phone, watch, laptop, desktop, tablet, server, or any other device or devices with network and processing capabilities.

The processor(s) that analyze sensor data, such as mobile device 104, may determine characteristics of the user's putt stroke from this data, with specific examples described below. For example, the processor(s) may calculate putt stroke metrics or other values that indicate whether the putt has desired features. Based on these calculations, one or more feedback signals may be transmitted to the user 101. Feedback may be generated using any type of actuators or signal generators. In the example shown in FIGS. 1A and 1B, the system generates audio feedback, using for example one or more speakers 105 integrated into or attached to mobile device 104. This type of feedback is illustrative; other types of feedback signals that may be used in one or more embodiments may include, without limitation, vibration, lights, visual displays, or temperature. Feedback signal generators may be located in any location where feedback signals can reach user 101. These feedback signal generators may be coupled to any processor that analyzes sensor data or receives the results of these analyses. Feedback may use any type of variation in the signals transmitted to the user. For example, audio feedback may consist of changes in pitch or volume, or in the presence or absence of certain sounds; visual feedback may consist of changes in intensity or presence of lights, or changes in the color of light, or changes in the frequency of flickering lights or strobes.

In the scenario illustrated in FIG. 1A, the system is configured to provide feedback to the user on how well the user is following desired trajectory 110 for the putter head. This trajectory may represent an ideal path for the putting stroke, which may in some cases depend on factors such as the user's height and stance, the characteristics of putter 102, or the desired path of the struck ball. The user 101 may be for example practicing repetitive strokes with the putter along this trajectory to generate muscle memory for this specific motion. In FIG. 1A, the user moves the putter along path 111 that follows trajectory 110 closely. The processor in mobile device 104 calculates this trajectory and generates a "positive" audio feedback signal 112, which may for example be a high-pitched tone at a low volume. This signal indicates to user 101 that the putt stroke is correct. In the scenario shown in FIG. 1B, the putter path 121 initially follows the desired trajectory 110, but at time 125 it deviates substantially from the desired trajectory. The audio feedback signal for this putt stroke therefore changes at time 125 to a different signal 122, which may for example be a lower-pitched and higher volume tone, signaling to the user that the path has deviated from the desired trajectory. Because data may be streamed continuously from sensor 103 to processor 104, and analyzed incrementally as it is received, the feedback signal can change almost immediately when the deviation occurs. A high sampling rate by sensor 103 may reduce the lag between a change in the putt motion and the resulting change in the feedback signal.

The specific audio signals described with respect to FIGS. 1A and 1B are illustrative; one or more embodiments of the invention may use any type of signal or signals set to any output levels. For example, the audio feedback for a correct putt stroke (within desired limits) may be silence, and any audible tone may indicate a deviation from the desired stroke. Feedback signals may be set to either discrete or continuous levels. For example, the tone or volume of audio feedback (or signal levels of any mode of feedback) may vary continuously as deviations from desired putt motions increase, or feedback signals may change discretely from a "positive" signal when the putt is within desired limits to a "negative" signal when the putt is outside desired limits.

The criteria for feedback described with respect to FIGS. 1A and 1B— following the desired putt trajectory—is also illustrative. One or more embodiments of the invention may evaluate any aspect of a putt and provide feedback according to how actual putter motion conforms to any desired criteria. Illustrative examples are described below.

Figure 2:
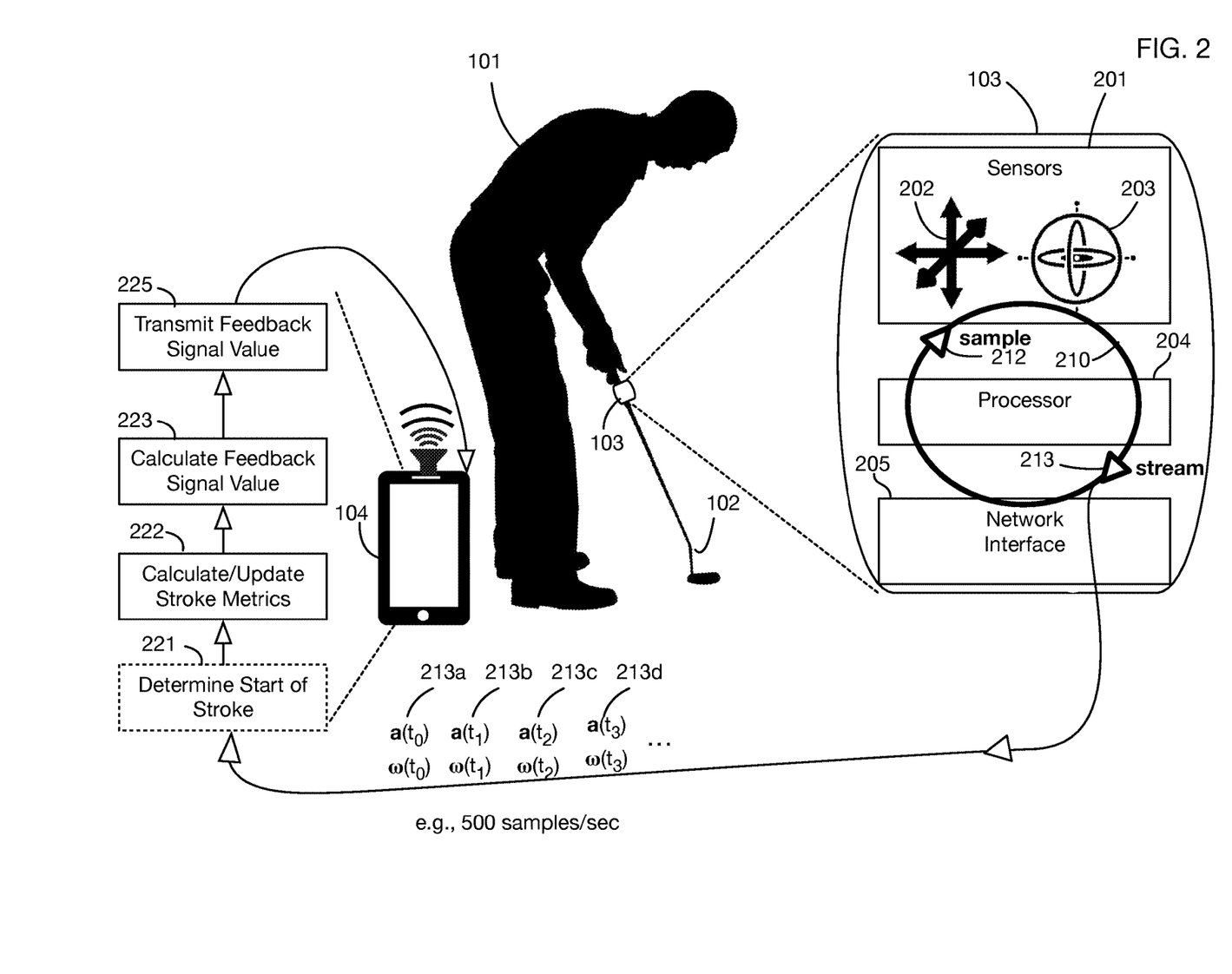
FIG. 2 shows detailed components of the sensor installed on the putter of FIG. 1A, and it shows illustrative processing steps that analyze the stream of data transmitted by the sensor to the mobile device.

FIG. 2 shows illustrative components of sensor unit 103 that measures motion of putter 102. The sensors 201 contained in 103 may include for example, without limitation, inertial motion sensors such as a 3-axis accelerometer 202 and a 3-axis rate gyroscope 203. One or more embodiments of the invention may use other sensors or addition sensors, such as for example a magnetometer, a range sensor, or a position sensor. Any type or types of sensors that measure the position or orientation or changes in position or orientation of the putter may be used in one or more embodiments. Sensor unit 103 may also include a processor 204, which may be a microprocessor or microcontroller for example. It may also include one or more network interfaces 205, which may include wireless interfaces such as Bluetooth, Bluetooth Low Energy, or Wi-Fi. One or more embodiments of the invention may include memory in the sensor unit 103. The sensor unit may also have a power supply such as a battery or an energy harvesting device.

Processor 204 may execute a sampling and streaming loop 210 that repeatedly performs sampling 212 of sensors 201 and then streaming 213 of the sampled values to one or more other systems or processors for analysis. In one or more embodiments the processor 204 within the sensor unit may also perform analysis of sensor data and may stream resulting analyses to other systems. FIG. 2 shows sensor data samples 213a, 213b, 213c, and 213d streamed successively to mobile device 104 (or any other processor or gateway) at successive times. In one or more embodiments, data may be sampled and streamed at multiple points in time throughout a putt stroke or other motion, potentially at a high sampling rate such as 500 samples or more per second.

As device 104 receives streamed samples such as 213a, 213b, 213c, and 213d, it processes these samples to determine the state of the putter and to calculate feedback signals accordingly. Samples may be processed successively as they arrive, or in batches; processing of individual samples may be more computationally intensive but provides the benefit of faster feedback. FIG. 2 shows illustrative processing steps 221 through 225 that may be performed in one or more embodiments. These steps may be performed by any processor or processors, including any combination of sensor processor 204, mobile device 104 processor, or any servers connected to these devices via network connections. Some steps may be omitted or rearranged in one or more embodiments or in certain feedback modes. Step 221 analyzes sensor data to determine when a putting stroke begins. This step may be performed while a user is preparing to start a backstroke. In contrast to some putt training systems, detection of the start of a stroke is dynamic in that the user can start a stroke at any time and the system will detect when the stroke begins. (Some other systems require a user to begin a stroke upon a signal such as an audio cue.) Step 222 calculates or updates one or more stroke metrics from the raw sensor data. As described below, these metrics may reflect any aspect of a putt, such as the putter position or orientation or any changes therein, or any values derived from a putter trajectory. Step 223 then calculates one or more feedback signal values from the update metrics. These signal values may reflect for example any deviations between calculated metrics and desired metric values. Step 225 then transmits the feedback signal value(s) to the signal generator(s) that generate signals accessible to user 101.

Figure 3:
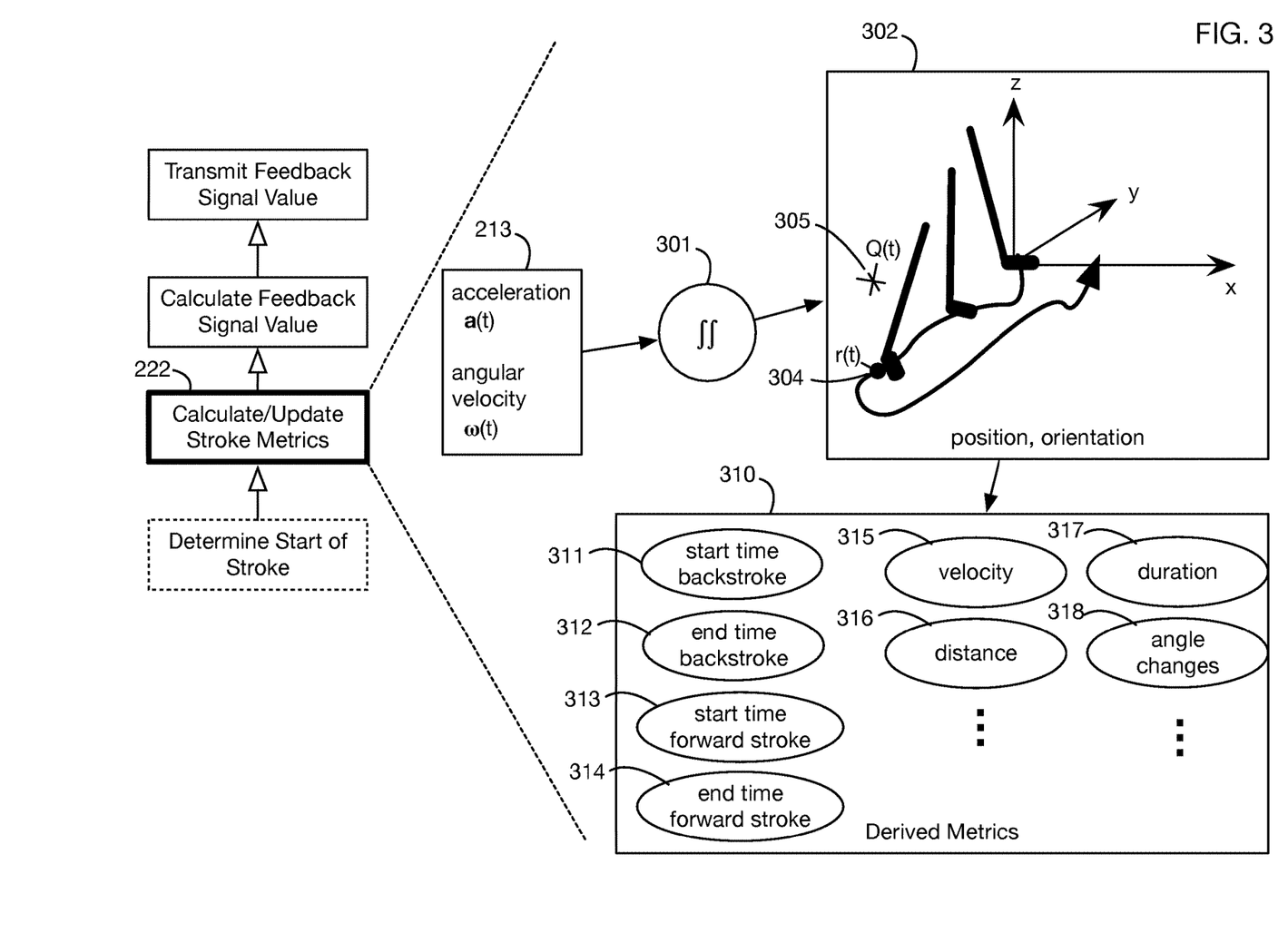
FIG. 3 illustrates calculation of putting metrics from sensor data streamed by the sensor throughout the putt.

FIG. 3 shows an illustrative example of specific calculations in step 222. Incoming sensor samples 213, which may include for example acceleration and angular velocity vectors, may be integrated in step 301 to form a trajectory 302 of the position 304 and orientation 305 of the putter over time. Treating the putter as a rigid body, sensor values from any location on the putter may be integrated to determine the position of any point on the putter and the orientation of any portion of the putter. Techniques for integrating inertial sensor data to derive position and orientation over time are known in the art, and one or more embodiments of the invention may use any of these known techniques. For example, the integration 301 may calculate the position over time of the sweet spot of the putter face, and the orientation over time of this putter face.

From the position and orientation trajectory 302, many possible metrics 310 may be calculated. The specific metrics generated in any embodiment may depend on the particular type of feedback that is desired for the putting stroke. Illustrative metrics that may be calculated may include, without limitation, the start and ending times 311 and 312 of the backstroke; the start and ending times 313 and 314 of the forward stroke; the durations 317 of the backstroke, forward stroke, or any other phases of the stroke; the velocity 315 of any portion of the putter (such as the sweet spot) at any point in time, the distance 316 travelled by the putter face over any period of time, and the changes 318 in any of the angles of the putter face over any period of time. Additional metrics may for example be derived from or based on any combinations of these factors, or based on comparisons of any of these factors to any thresholds or standards.

Figure 4:
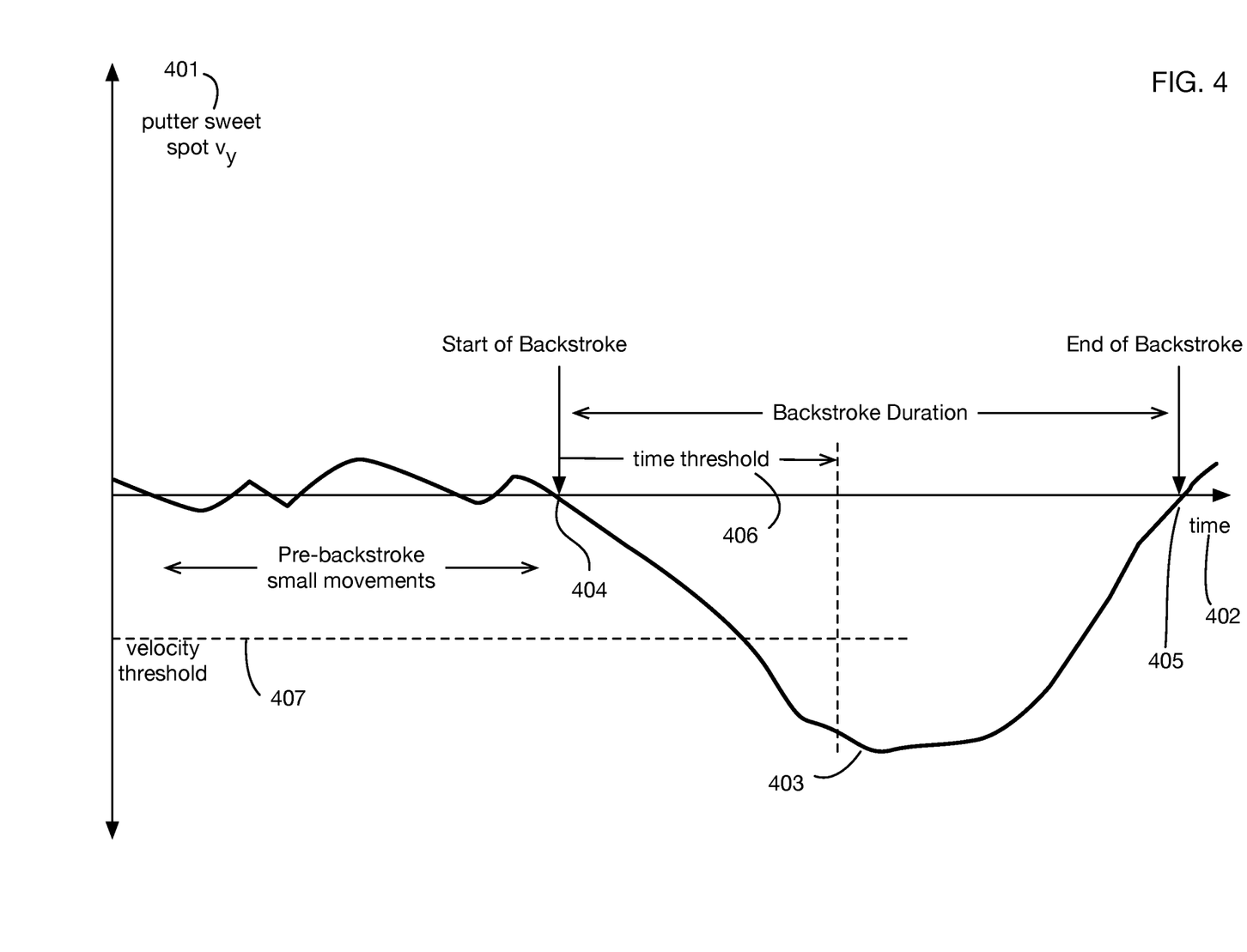
FIG. 4 illustrates dynamic detection of the start of a putt backstroke from sensor data.

FIG. 4 shows an illustrative method that may be used in one or more embodiments to determine the starting time of a putt backstroke. As described with respect to FIG. 3, sensor data may be integrated to obtain the position of the sweet spot of the putter over time. The sweet spot velocity vector may then be obtained as the derivative of the position. Using a coordinate system as shown in 302 of FIG. 3, with the y-axis pointing in the desired direction of a putt, a backstroke corresponds to a negative y velocity of the sweet spot. FIG. 4 shows an illustrative plot 403 of the y-velocity 401 of the sweet spot as a function of time 402. As a golfer prepares to start a putt, the putter face typically moves slightly back and forth, so that y-velocity may become slightly negative prior to the true start of the backstroke. However, once a negative y-velocity has been sustained for a threshold period of time 406 or has exceeded (in the negative direction) a (negative) threshold velocity value 407, it can be determined that an actual backstroke has begun. The start of backstroke 404 can then be determined as the time of the last zero crossing of curve 403 before the y-velocity becomes sustainably negative. Similarly, the end of backstroke time 405 can be determined as the subsequent zero crossing when the y-velocity is no longer negative.

Figure 5:
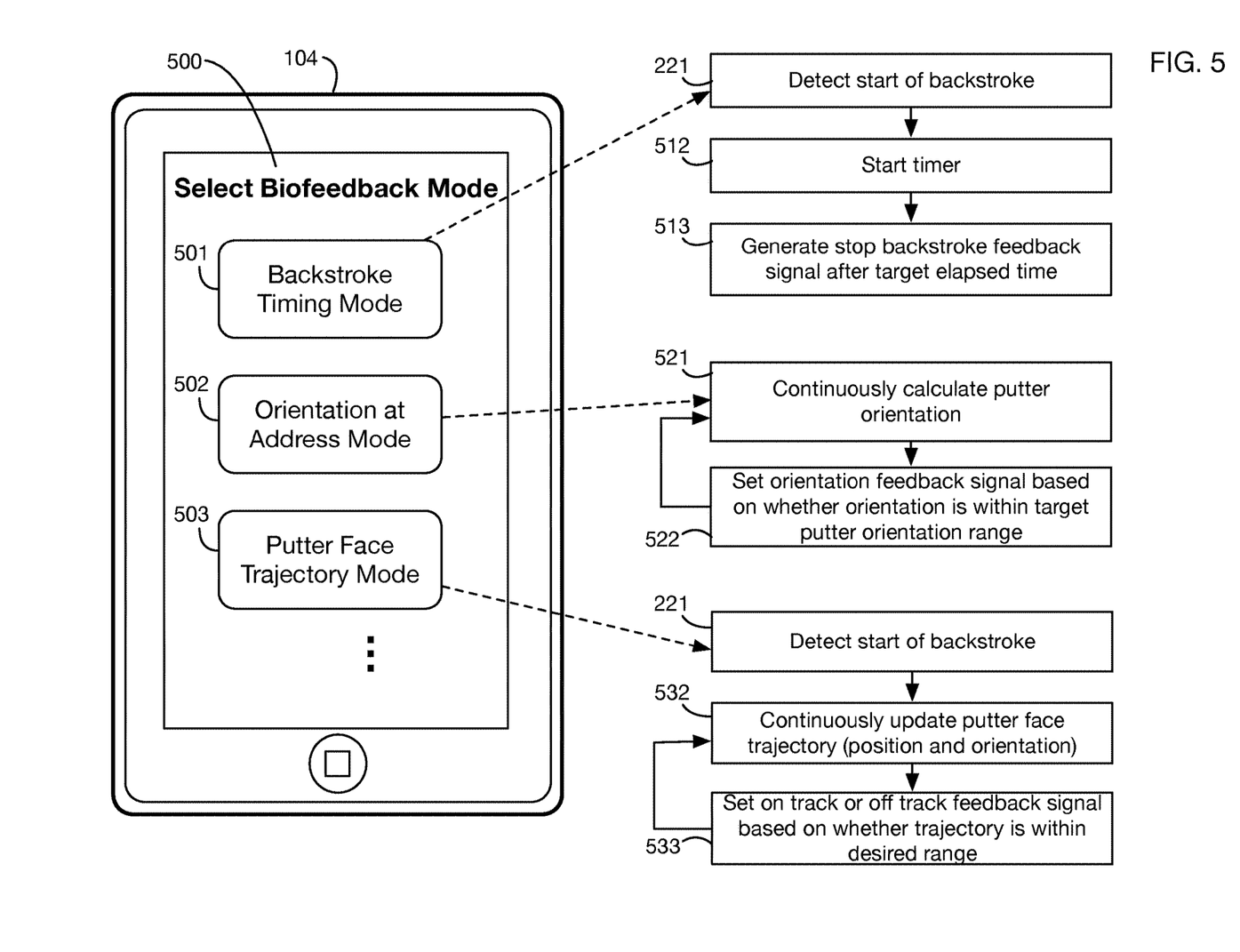
FIG. 5 shows three illustrative feedback modes that may be enabled by one or more embodiments, and the processing steps performed in each mode.

In one or more embodiments of the invention, a user may be able to select from several different feedback modes, where each feedback mode provides feedback on a particular aspect of putting. One or more embodiments may also provide multi-mode feedback where putt motions are monitored simultaneously for multiple aspects. FIG. 5 shows an illustrative embodiment that supports at least three modes of feedback, as selected in input screen 500 of mobile device 104. Mode 501 provides feedback on the timing of a backstroke. Mode 502 provides feedback on the putter orientation at address. Mode 503 provides feedback on the trajectory of the putter face through the backstroke. When the user selects an input control to set the mode, the processing of incoming sensor data is configured to provide feedback on the selected putting aspect.

In backstroke timing mode 501, the user may be guided to use a consistent backstroke that has a fixed target backstroke duration. This target duration may be based on accepted or common standards, or it may be configurable by the user. A putt stroke metric of the elapsed time between the start of the stroke and the current time may be compared to the target duration, and when this elapsed time equals or exceeds the target duration, feedback may be generated to signal that the backstroke should stop. In one or more embodiments, the analysis system may first detect the start of a backstroke in step 221, using for example the method described with respect to FIG. 4, and then start a timer in step 512 with a duration equal to the target backstroke elapsed time. When the timer expires, a stop backstroke feedback signal may be generated in step 513 to tell the user that the backstroke motion should stop. In another embodiment of this feedback mode, the system may measure the backstroke duration (as shown in FIG. 4), and may provide a feedback signal based on comparing the actual backstroke duration with a target duration. In one or more embodiments feedback may also be provided on the timing of the forward stroke; for example a forward stroke timer may be started at the end of backstroke (either the actual detected end of backstroke or the expected time based on the target elapsed time). When the forward stroke timer expires after an expected forward stroke duration, another feedback signal may be provided to the golfer indicating that the forward stroke should be finished.

In orientation at address mode 502, the user may be guided to hold the putter in a correct orientation at address. In this mode, step 521 calculates the putter orientation for each new sensor data sample, and the analyzing processor then sets a feedback signal in step 522 based on whether the calculated orientation is within a target putter orientation range. This cycle repeats while the system remains in orientation at address mode.

In putter face trajectory mode 503, the user may be guided to make a backstroke with a simple pendulum-like rotation of the shoulders, without making other movements that may result in the putter face being skewed when it hits the ball after the forward stroke, which may result in a poor putt. A proper backstroke is reflected in a trajectory of the putter face with a specific curve for the putter face position and orientation as the putter head moves backwards through the backstroke. In this mode, after detection of the start of backstroke in step 221, the analysis system may update the putter face trajectory (both position and orientation) on each new sample, in step 532, and set a feedback signal based on comparison of this trajectory to the desired trajectory in step 533. For example, without limitation, feedback may be binary: an "on track" signal may be generated if the trajectory is close to the desired trajectory, and an "off track" signal may be generated if the trajectory deviates too much from the desired trajectory. Steps 532 and 533 may repeat in a loop for each new sensor data sample.

Figure 6:
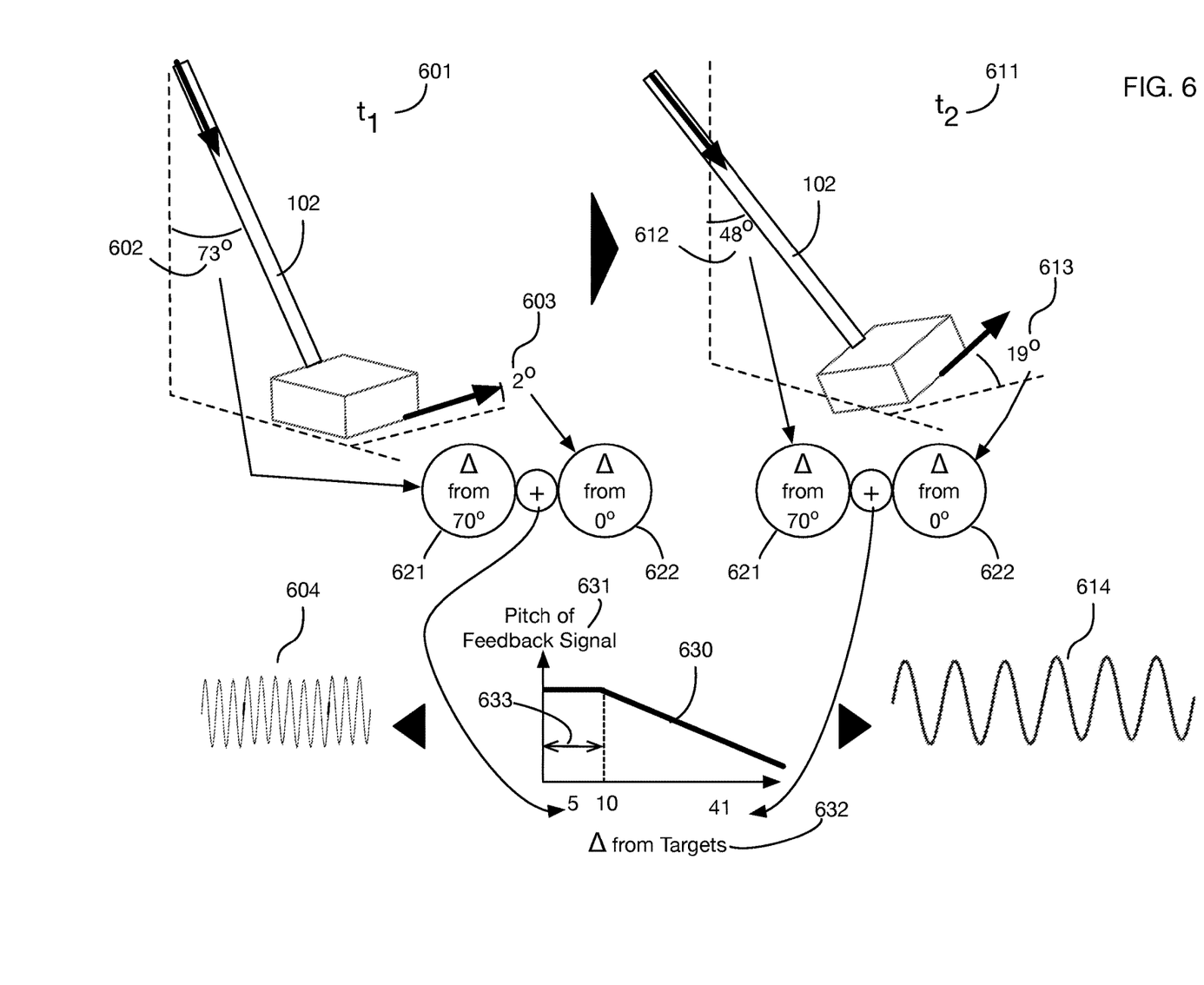
FIG. 6 shows an illustrative mode that provides feedback on how close the putter orientation at address is to a target orientation.

FIG. 6 shows an illustrative scenario for a system operating in "orientation at address" mode. The ideal orientation at address may in general depend on the putter geometry and potentially on other factors such as the terrain for the putt. In the scenario of FIG. 6, the ideal orientation for the putter 102 at address is a lie angle of 70 degrees (measured between the putter shaft and the vertical axis) and a loft angle of 0 degrees (measured between the normal to the putter face and the horizontal plane). The feedback signal is an audio signal with a pitch that varies depending on how close the actual putter orientation is to these ideal angles. The pitch 631 is calculated using curve 630 that is a function of the total absolute differences 632 of the lie and loft angles to their ideal values. At time 601, the lie angle 602 and loft angle 603 are relatively near the ideal values, so the sum of absolute differences 621 and 622 results in a high-pitched audio feedback signal 604. This high pitch indicates to the golfer that the orientation is at or near the ideal orientation. Subsequently at time 611, the lie angle 612 and the loft angle 613 differ significantly from their ideal values, so the sum of angle differences results in a low-pitched audio feedback signal 614. This pitch indicates to the golfer that the orientation needs to be corrected. If the golfer makes an adjustment in the correct direction, curve 630 shows that the pitch will increase, while adjustments in the wrong direction will decrease the pitch. The golfer is therefore guided by the feedback signal to put the putter in the correct orientation at address.

Figure 7:
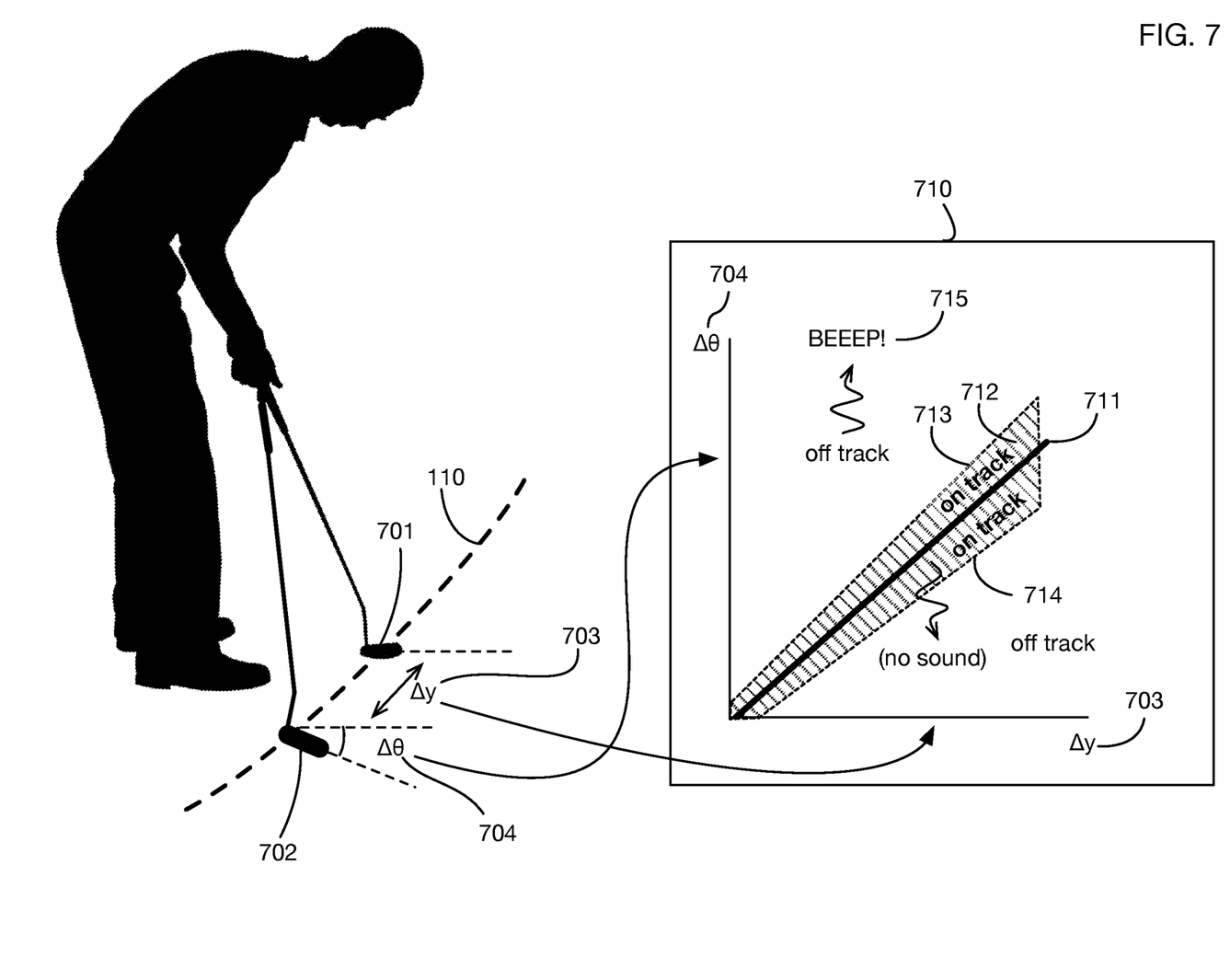
FIG. 7 shows an illustrative mode that provides feedback on whether a putter face is following an expected relationship between distance and putter face orientation through the backstroke.

FIG. 7 shows an illustrative scenario for a system operating in "putter face trajectory" mode. For a backstroke that follows an ideal "pendulum motion" trajectory, the change 704 in the face angle of the putter from the point of address 701 to any point 702 on the backstroke is approximately a linear function of the distance 703 travelled by the putter head. This linear function is shown as line 711 in graph 710. In one or more embodiments, an "off track" feedback signal may be generated if the actual change in face angle deviates sufficiently from line 711; otherwise, an "on track" feedback signal may be generated. For audio feedback, on-track and off-track signals may have different frequencies for example; or in one or more embodiments, there may be no sound for on-track putts, and a sound for an off-track putt. In the embodiment shown in FIG. 7, the region between lines 713 and 714 defines the "on track" zone, and the feedback for on-track putts is no sound; outside this zone the feedback for off-track putts is a beep 715 that signals the need for a correction. In one or more embodiments a feedback signal may vary continuously based for example on the distance between the actual face angle and the desired face angle as described by line 711. One or more embodiments may base feedback signals on other changes in putter face orientation besides face angle, such as loft and lie angles, or combinations of angle changes, using similar relationships between putter face orientation and distance.

Figure 8:
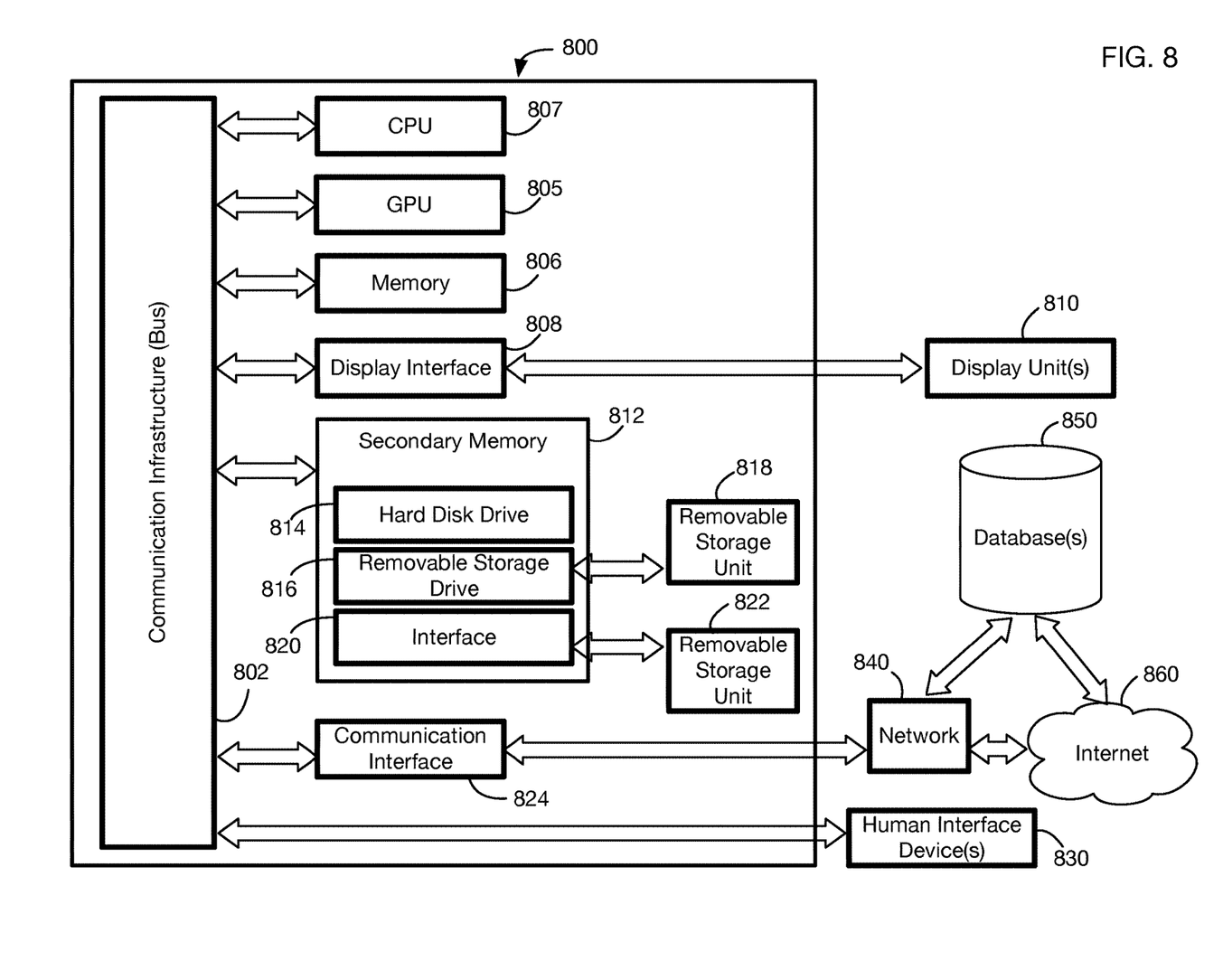
FIG. 8 shows an illustrative architecture of computer or processor hardware that may be used for elements of the system, including the sensor and the mobile device or server that processes sensor data.

FIG. 8 shows an embodiment of exemplary computer 800 that may be utilized in, by, or as any component in the system. For example, any of the elements shown in computer 800 may be incorporated into a sensor unit, or into a mobile device other processor that analyzes sensor data. In one or more embodiments, computer 800 may be a network of computers, each of which may have any or all of the components shown in FIG. 8. In one or more embodiments, computer or computers 800 may also be utilized to implement any function in the system, i.e., any step or act or function that executes in any computer or server or engine in the system. Computer 800 may include processor CPU 807 that executes software instructions specifically tailored to the respective functions of embodiments of the invention. The software instructions, otherwise known as computer program instructions, may reside within memory 806. Computer 800 may include processor GPU 805, which may execute graphics instructions or other instructions for highly parallel operations, for example. GPU program instructions may also reside within memory 806. Computer 800 may include display interface 808, which may drive display unit or units 810 of any computer in the system as desired. Some computers 800 may or may not utilize a display. Computer 800 may include communication interface 824, which may include wireless or wired communications hardware protocol chips. In one or more embodiments of the invention communication interface 824 may include telephonic and/or data communications hardware. In one or more embodiments communication interface 824 may include a Wi-Fi™ and/or BLUETOOTH™ wireless communications interface. Any wireless network protocol or type may be utilized in embodiments of the invention. CPU 807, GPU 805, memory 806, display interface 808, communication interface 824, human interface devices 830, secondary memory 812, such as hard disk 814, removable storage 816, secondary memory interface 820 and removable storage units 818 and 822 may communicate with one another over communication infrastructure 802, which is commonly known as a "bus". Communications interface 824 may communicate over any wired or wireless medium that allows for communication with other wired or wireless devices over network 840. Network 840 may communicate with Internet 860 and/or database or databases 850. Database 850 may be utilized to implement any database described herein.

While the ideas herein disclosed has been described by means of specific embodiments and applications thereof, numerous modifications and variations could be made thereto by those skilled in the art without departing from the scope of the invention set forth in the claims.

What is claimed is:

1. A putting biofeedback system that analyzes motion data, comprising:
   an inertial motion sensor package coupled to a putter, said inertial motion sensor package comprising
     an accelerometer;
     a gyroscope; and
     a network interface;
     wherein said inertial motion sensor package is configured to
       capture inertial sensor data during a putting session movement wherein a user performs one or more putt strokes with said putter; and,
       stream said inertial sensor data over said network interface continuously as said inertial sensor data is captured such that said inertial sensor data is streamed from said inertial motion sensor package immediately after said inertial sensor data is captured;
   a feedback signal generator configured to transmit a feedback signal to said user;
   a processor coupled to said inertial motion sensor package via a network connection, and
     coupled to said feedback signal generator, wherein said processor is configured to receive said inertial sensor data that is transmitted from said inertial motion sensor package;
     determine a starting time of a putt stroke from said inertial sensor data;
     calculate one or more putt stroke metrics from said inertial sensor data;
     calculate a feedback signal value from said one or more putt stroke metrics; and,
     transmit said feedback signal value to said feedback signal generator;
   wherein said feedback signal generator transmits said feedback signal to said user based on said feedback signal value received from said processor,
   wherein said feedback signal comprises one or more of audio, vibration, lights, visual displays and temperature,
   wherein said feedback signal generator varies said feedback signal depending on said feedback signal value received from said processor,
     such that characteristics of said feedback signal vary based on one or more deviations from a desired output of said one or more putt stroke metrics,
   wherein, since said inertial sensor data is streamed continuously from said inertial motion sensor package to said processor and said inertial sensor data is analyzed incrementally as it is received, said feedback signal changes as soon as said one or more deviations occur,
   such that a high sampling rate by said inertial motion sensor package reduces a lag between a change in the putting session movement and a resulting change in the feedback signal,
   such that said feedback signal changes discretely from a positive signal when the one or more putt stroke metrics are within desired limits to a negative signal when the one or more putt stroke metrics are outside said desired limits, and
   such that as soon as said one or more deviations occur, indicating that the user made an error or that a correction is needed, said feedback signal is immediately transmitted to said user as a feedback loop, wherein said feedback loop is configured to enhance a learning cycle for putting by said user.

2. The putting biofeedback system that analyzes motion data of claim 1, wherein said processor is further configured to calculate said feedback signal value and to transmit said feedback signal value to said feedback signal generator at a plurality of times during said putt stroke that are before an ending time of said putt stroke.

3. The putting biofeedback system that analyzes motion data of claim 1, wherein said processor and said feedback signal generator are integrated into a mobile device used by said user.

4. The putting biofeedback system that analyzes motion data of claim 1, wherein said accelerometer comprises a three axis accelerometer;
   said gyroscope comprises a three axis gyroscope; and,
   said network interface comprises a wireless network interface.

5. The putting biofeedback system that analyzes motion data of claim 1, wherein said feedback signal generator comprises a speaker;
   said feedback signal comprises an audio output from said speaker; and,
   said feedback signal value comprises one or more of a pitch and a volume of said audio output.

6. The putting biofeedback system that analyzes motion data of claim 1, wherein said one or more putt stroke metrics comprise a duration of a backstroke comprising an elapsed time between said starting time of said putt stroke and a current time during said putt stroke; and,
   said calculate said feedback signal value comprises when said duration of said backstroke equals or exceeds a target backstroke duration, set said feedback signal value to a stop backstroke value.

7. The putting biofeedback system that analyzes motion data of claim 1, wherein said one or more putt stroke metrics comprise a putter orientation at address; and, said feedback signal value is based on a difference between said putter orientation at address and
an ideal putter orientation at address.

8. The putting biofeedback system that analyzes motion data of claim 1, wherein said one or more putt stroke metrics comprise
a distance travelled by a face of said putter since said starting time of said putt stroke; and
a change in orientation of said face of said putter since said starting time of said putt stroke;
said calculate said feedback signal value comprises
when said change in orientation of said face of said putter is within a target face orientation range that is a function of said distance travelled by said face of said putter, set said feedback signal value to an on track value; and,
when said change in orientation of said face of said putter is not within said target face orientation range, set said feedback signal value to an off track value that differs from said on track value.

9. The putting biofeedback system that analyzes motion data of claim 1, wherein said processor is configured to be in a feedback mode selected from a plurality of feedback modes; and,
said calculate said feedback signal value from said one or more putt stroke metrics is a function of said feedback mode.

10. The putting biofeedback system that analyzes motion data of claim 9, wherein said plurality of feedback modes comprises
a backstroke timing feedback mode;
an orientation at address feedback mode; and,
a putter trajectory feedback mode.

11. The putting biofeedback system that analyzes motion data of claim 10, wherein when said feedback mode is said backstroke timing feedback mode,
said one or more putt stroke metrics comprise a duration of a backstroke comprising an elapsed time between said starting time of said putt stroke and a current time during said putt stroke; and,
said calculate said feedback signal value comprises
when said duration of said backstroke equals or exceeds a target backstroke duration, set said feedback signal value to a stop backstroke value;
when said feedback mode is said orientation at address feedback mode,
said one or more putt stroke metrics comprise a putter orientation at address; and,
said feedback signal value is based on a difference between said putter orientation at address and an ideal putter orientation at address;
when said feedback mode is said putter trajectory feedback mode,
said one or more putt stroke metrics comprise
a distance travelled by a face of said putter since said starting time of said putt stroke; and
a change in orientation of said face of said putter since said starting time of said putt stroke;
said calculate said feedback signal value comprises
when said change in orientation of said face of said putter is within a target face orientation range that is a function of said distance travelled by said face of said putter, set said feedback signal value to an on track value; and,
when said change in orientation of said face of said putter is not within said target face orientation range, set said feedback signal value to an off track value that differs from said on track value.

12. The putting biofeedback system that analyzes motion data of claim 11, wherein said processor is further configured to calculate said feedback signal value and to transmit said feedback signal value to said feedback signal generator at a plurality of times during said putt stroke that are before an ending time of said putt stroke;
said processor and said feedback signal generator are integrated into a mobile device used by said user;
said accelerometer comprises a three axis accelerometer;
said gyroscope comprises a three axis gyroscope;
said network interface comprises a wireless network interface;
said feedback signal generator comprises a speaker;
said feedback signal comprises an audio output from said speaker; and,
said feedback signal value comprises one or more of a pitch and a volume of said audio output.

* * * * *